No. 843,155. PATENTED FEB. 5, 1907.
R. C. LANPHIER.
MOTOR METER FOR ALTERNATING CURRENTS AND METHOD OF OPERATING
THE SAME.
APPLICATION FILED APR. 27, 1906.
2 SHEETS—SHEET 1.
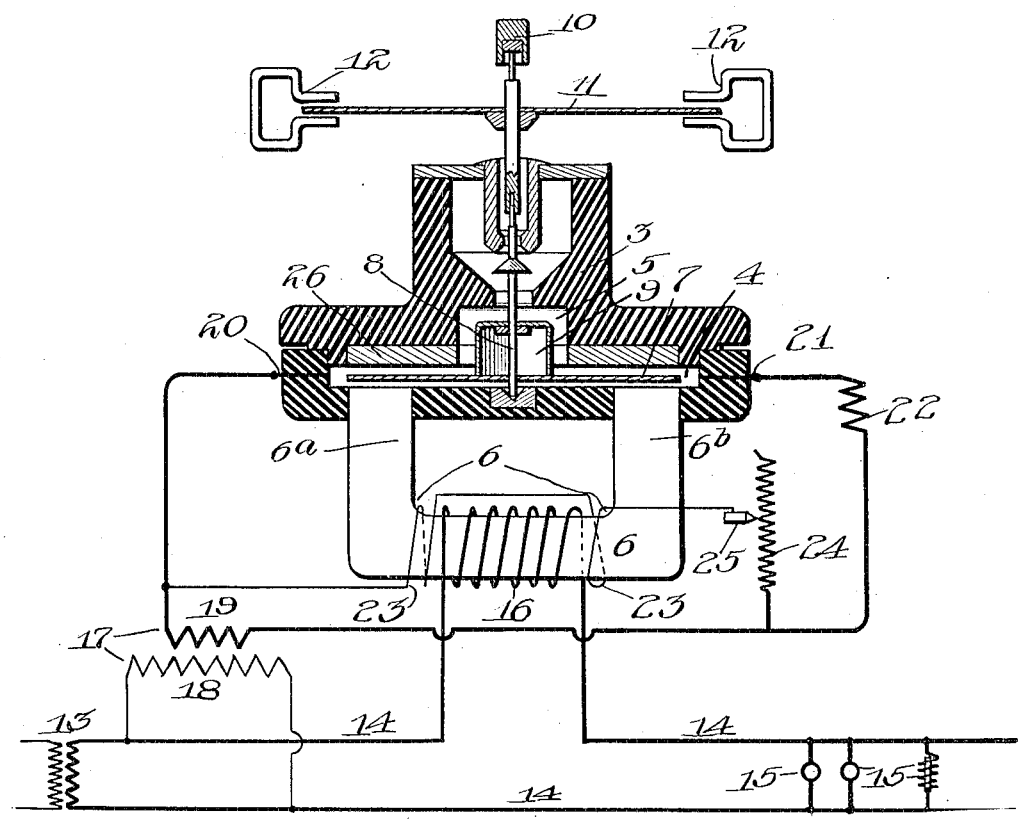
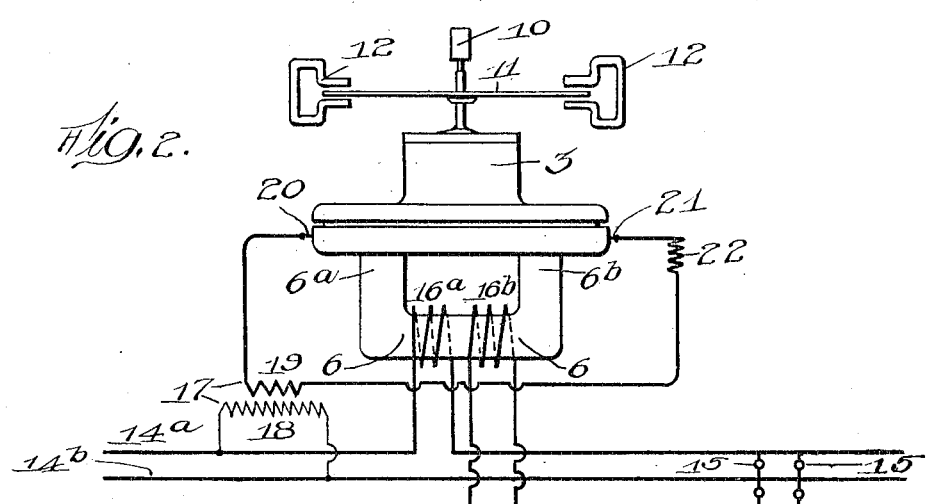
Witnesses:
Inventor:
Robert C. Lanphier
by Bond, Adams, Pickard & Jackson
Attys

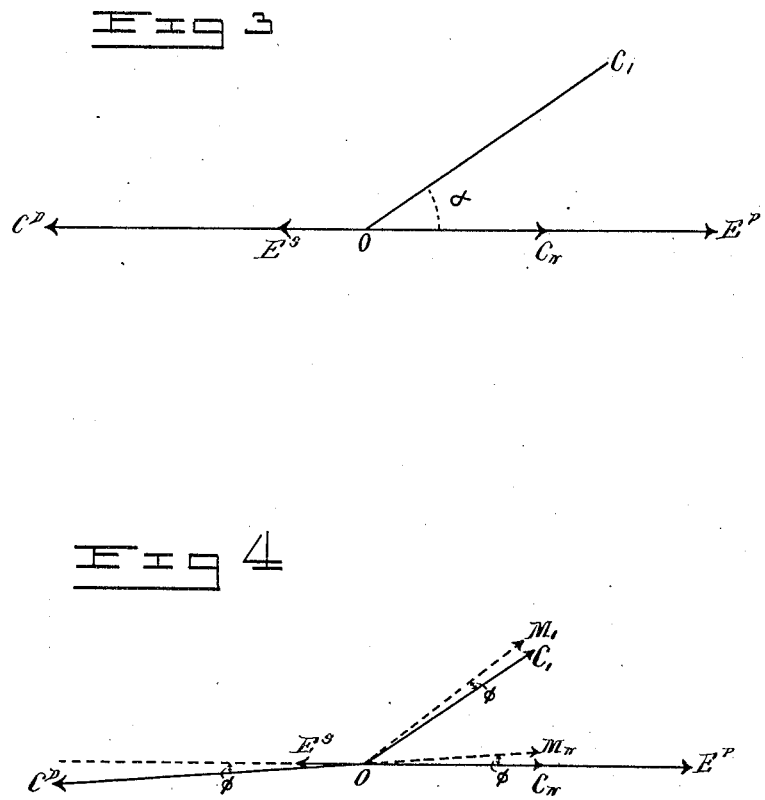

UNITED STATES PATENT OFFICE.

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

MOTOR-METER FOR ALTERNATING CURRENTS AND METHOD OF OPERATING THE SAME.

No. 843,155.  Specification of Letters Patent.  Patented Feb. 5, 1907.

Application filed April 27, 1906. Serial No. 314,060.

*To all whom it may concern:*

Be it known that I, ROBERT C. LANPHIER, a citizen of the United States, residing at Springfield, in the county of Sangamon and State of Illinois, have invented certain new and useful Improvements in Motor-Meters for Alternating Currents and Methods of Operating the Same, of which the following is a specification, reference being had to the accompanying drawings.

My invention relates to an improved motor-meter of the mercury type for alternating currents, and it has for its principal object new and improved devices and mechanism by which a meter of the mercury type having a chamber adapted to contain mercury and armature rotatable therein and an energizing field-magnet may be caused to operate upon an alternating current and to register as a true watt-hour meter.

It has for another object a new and improved method of operating such a meter by alternating currents of electricity to register as a watt-hour meter. Heretofore mercury-meters of this general type have been principally used for measuring direct currents. Various devices, however, have been invented and constructed whereby mercury-meters of this type might be used to register alternating currents. For instance, meters of this type have been constructed in which the main-load alternating current has been passed through the mercury-chamber and across the disk and the electromagnet energized by a shunt-current, the shunt being brought into zero-phase relation with the impressed electromotive force by means of a condenser located in series with the energizing-coils, and a mechanism of this nature has been shown and described by me in a pending application for Letters Patent, Serial No. 223,693, filed September 8, 1904. In the practical operation, however, of such a meter with a condenser a difficulty arises, owing to the variations in frequency of the alternating current. When such variations in frequency occur under the well-known law of operation of a condenser, inaccuracies in the operation of the meter are at once produced, the meter running too slow as such variations in frequency occur.

It is the object of my invention to produce new and improved devices by means of which these difficulties may be overcome and a motor-meter of the mercury type be produced which will register accurately as a watt-hour meter on an alternating current regardless of any such differences in frequency in the alternating current. Generally speaking, I accomplish this end by energizing the magnet by means of a few turns of relatively heavy wire through which the main-load current or a current proportional to the main-load current upon the meter is passed and by directing through the chamber and across the armature a secondary induced current of low potential proportional to the circuit-pressure and of large volume and approximately one hundred and eighty degrees in phase from the impressed electromotive force.

I accomplish these objects as illustrated in the drawings and set forth in the claims.

In the drawings, Figure 1 is a side view of my new and improved meter, partially in vertical section and showing the windings diagrammatically, the supporting-casing and non-essential parts not being shown for the purpose of clearness of illustration; and Fig. 2 is a side elevation of my meter as applied to a three-wire circuit, showing the windings diagrammatically. Fig. 3 is a vector diagram illustrating the operation, neglecting the magnetic lag in the series magnetic field. Fig. 4 is a vector diagram illustrating the operation of the meter with the magnetic lag of the series field taken into account.

3 indicates the body or chamber-casing of the meter, which is formed of non-magnetic material and contains a chamber 4, adapted to contain mercury. The chamber 4 is provided with an enlarged portion 5.

6 indicates an electromagnet having pole-pieces 6ª 6ᵇ. The electromagnet and pole-pieces are preferably formed of laminated soft iron, and the pole-pieces penetrate the casing to the chamber 4. 7 indicates a disk, preferably formed of copper, which is mounted upon a spindle 8, journaled in said casing 3. The disk 7 is formed of very thin material and is provided with a buoyancy or flotation chamber 9, adapted to float the disk with its attached parts, hereinafter described, slightly upward. The upper end of the spindle 8 rests against a jewel-bearing 10.

11 indicates a brake-disk mounted upon the spindle 8 and acted upon by damping-magnets 12.

26 indicates a magnetic return-plate embedded in the body of the casing 3.

The construction of the disk, with its flotation-chamber, is the same as shown in the application for Letters Patent by me, Serial No. 275,437, filed August 23, 1905. The casing 3, the brake-disk and its accompanying braking-magnets, and the pole-pieces 6 of the energizing-electromagnet may be of any well-known and approved form and construction and form in themselves no part of my present invention.

13 indicates the supply-transformer of the system, to which the meter is connected.

14 indicates the main load-circuit, and 15 the translating devices in said circuit.

16 indicates a winding for the electromagnet 6, consisting of a few turns of heavy wire connected in series with the load on the main circuit.

17 indicates a step-down low-potential transformer which in the actual construction will be placed within the outside casing of the meter. (Not shown.)

18 indicates the primary of the transformer 17, which is connected across the main-load circuit.

19 indicates the secondary of the transformer, whose terminals are connected with terminals 20 21, which open into the mercury-chamber 4.

The step-down transformer 17, as was said, is of low potential and is so constructed and built with a closed magnetic circuit as to produce in its secondary winding 19 a pressure about one hundred and eighty degrees from the impressed electromotive force on the circuit.

22 indicates an inductance-coil located in the circuit of the secondary of the transformer 19.

23 indicates a few turns of a winding of fine wire tapped across the secondary of the transformer and having in series an adjustable non-inductive resistance 24 with a movable contact 25, whereby the resistance may be varied.

It will be obvious that the mercury-chamber 4 and armature 7, forming a portion of the secondary circuit of the transformer 17, will have practically no self-induction. As has been said, the transformer 17 is a low-potential transformer—that is to say, is so constructed that a current of low potential and of relatively large volume is produced in the secondary circuit. The transformer, therefore, being so constructed as to produce a pressure of, say, one-fortieth to one-tenth of a volt in the secondary, so that a current of, say, from ten to fifteen amperes will pass through the circuit and through the mercury-chamber and across the disk, this current will obviously vary directly with any variations of the impressed electromotive force. The main or series coil 16 wound upon the laminated core of the electromagnet 6 will produce in the gaps between the pole-pieces 6ª 6ᵇ and the return-plate 26 within the chamber 4, in which the disk 7 rotates, a magnetic flux which will vary in intensity with the amount of the main-load current and will also vary in its phase relation with the impressed electromotive force as the current through the winding 16 varies according to the nature of the load on the meter. Since the current flowing between the terminals 20 and 21 across the disk 7 is constant if the voltage remains constant, and since the magnetic field produced by the windings 16 varies directly with the load-current, it is evident that the product of these two factors will produce a torque upon the disk 7 proportional to the true wattage of the load and that any difference in phase between the current in the disk and the magnetic field will be taken into account. As the magnetic field is alternating, it is evident that there will be practically no damping effect upon the armature as the load increases, and hence no error will be introduced into the meter, as would be the case if a direct current were passed through the windings 16 under similar circumstances. As the windings 16 consist, as has been said above, of a few turns of heavy wire, what slight inductance may be caused therein is negligible because of the much greater drop in pressure through the load beyond. For instance, and for the sake of illustration, if the reactive drop across the windings 16 is one-fourth of a volt and the meter is connected to a one-hundred-and-ten-volt circuit, the drop through the load is obviously nearly five hundred times as great as that through the windings 16, and therefore the self-induction of the windings being relatively so small is negligible and will cause no appreciable error. Owing to the well-known fact, however, of hysteresis, the magnetism produced in the electromagnet 6 will have some lag, and for this reason I have introduced into the secondary circuit of the transformer a few turns of inductive winding 22, which are in series with the armature and which may be varied in any well-known way so as to cause a slight lag in the current passing through the secondary circuit of the transformer and through the armature to conform with the slight lagging effect in the series field due to the hysteresis in the iron of the electromagnet. When this adjustment is properly made, the meter will obviously measure true energy under all conditions of load, whether the load be inductive or non-inductive.

The function of the transformer is twofold, first, to give a very low potential proportionate to the circuit-pressure (impressed electromotive force) which shall be available for sending a large volume of current through the disk, which disk in the apparatus described is the real "pressure element" of the meter, and, second, when doing this to operate with a very small constant loss—that is, to make the "shunt loss" of the meter very low, which of course is necessary in a meter, as the current passing through the shunt element is not measured by the meter. The nature of the secondary winding of the transformer and its relations to the other parts and the circuit through the armature must be such that the large current through the armature shall be substantially one hundred and eighty degrees out of phase with the impressed electromotive force (the circuit-pressure on the transformer primary) in order that the meter shall measure true energy upon either a non-inductive or an inductive load. This operation is illustrated and made clear by the vector-diagrams, Figs. 3 and 4. In Fig. 3 the operation is illustrated without taking into account the slight lag caused by hysteresis in the electromagnet. In that diagram $E^P$ is a vector showing in time, direction, and magnitude the circuit-pressure or primary electromotive force on meter-transformer. $C_N$ is a load-current of, say, ten amperes, non-inductive, and hence along the same line as $E^P$. $C_I$ is the same amount of load lagging, say, $< \alpha = 45°$—that is, a load of .707 power factor. $E^S$ is the secondary electromotive force of the transformer, which is almost exactly one hundred and eighty degrees in phase from $E^P$. $C^D$ is the current sent through the disk by $E^S$ in phase with $E^S$, as the disk-circuit is assumed under the present circumstances to be entirely non-inductive. Now $C^D$ may be considered as reversed in the direction of $E^P$ and $C_N$, this meaning simply a reversal of connections, as is well understood, as $C^D$ is one hundred and eighty degrees from $E^P$. Since $C^D$ is equivalent, therefore, to being in phase with $E^P$, the torque exerted upon the armature carrying current $C^D$ by the field produced in the laminated magnet by current $C_N$ or $C_I$ through the series-coil will be exactly proportional to the true watts, neglecting, as has been stated in this case, any magnetic lag in the field-magnet.

In Fig. 4 a vector-diagram is shown in which the slight lag in the series-field magnetism from the phase of the load-current and which actually exists, as has been stated above, in practice is shown. The lettering $E^P$ $E^S$, $C^D$, $C_N$, and $C_I$ indicate the same a the lettering in Fig. 3, above set forth. In this case, however, the field magnetism lags in phase by the angle $\phi$ from the current producing it. Hence for non-inductive load $C_N$ the magnetic vector is $M_N$, and for inductive load of forty-five degrees lag the magnetic vector is $M_I$. Hence with this actual condition, it is necessary to give a slight equal lag $\phi'$ to the disk-current in order that the torque at all power factors of load shall be proportional to the waits, as will be seen from the vector-diagram. This slight lag is obtained in the meter by the few turns of inductive winding 22 in series between the secondary of the transformer and the disk-circuit above described, which may be readily adjusted initially in any well-known manner to make the meter correct under all conditions of load.

In order to overcome any slight initial friction which might exist in the meter and to make it read correctly on a very light load, the windings 23, above described, and consisting of a few turns of comparatively fine wire, are placed upon the core of the electromagnet 6 and connected across the secondary circuit of the transformer with the non-inductive resistance 24 and adjustable contact 25 in series. By means of this adjustable resistance the meter can be set exactly correct on a very light load, as the turns 23 will produce the necessary constant initial field in correct phase with the current through the armature to give a slight initial torque. This method, however, of overcoming initial friction and of causing the meter to run correctly on slight load may be varied in other well-known ways and forms of itself no part of my present invention.

In Fig. 2 I have shown a meter of this type arranged for the ordinary three-wire system. In this figure 3 indicates the casing inclosing the mercury-chamber and disk. 6 indicates the electromagnet having pole-pieces $6^a$ $6^b$. 17 indicates the low-potential transformer having a primary 18 and secondary 19 with the inductance-coil 22, all operating in the same manner, as above described, and whose connections are obvious from the diagram. $16^a$ indicates a series-coil connected in one outer wire $14^a$ of the system, and $16^b$ a series-coil of an equal number of turns with $16^a$, connected on the other outer wire $14^c$ winding 16. The coils $16^a$ and $16^b$ consist, as was the case of the coil 16 above described, of a few turns of heavy copper wire, each of the same number of turns and wound upon the core of the magnet 6. I have shown this method of applying my invention to a three-wire system for purposes of illustration and to show how it may be applied to such a system. As the mere application of my invention to a three-wire system does not of itself form any part of my present invention it is believed that no further description of this arrangement is necessary here.

It will be understood, of course, that the spindle of the armature will be connected to a suitable registering train and that all the operative parts in actual construction will be inclosed in an outer casing. As these parts, however, may be of any well-known form and construction and their structure and operation is clearly understood, I have omitted them from the drawings and description for the purpose of clearness of illustration of the essential features of my invention, and in order not to encumber the essential features with the description of parts which will be readily understood and supplied by any one skilled in the art.

That which I claim as my invention, and desire to secure by Letters Patent, is—

1. In a motor watt-hour meter for alternating currents, the combination with a chamber adapted to contain a conducting fluid, an armature rotatable therein, and a field-magnet adapted to act upon said armature to cause rotation, of an energizing-winding for said magnet carrying current proportional to the load upon the meter, and a transformer having its primary winding in derivation to the load-circuit and its secondary winding connected to terminals adapted to direct its current across the armature, substantially as described.

2. In a motor watt-hour meter for alternating currents, the combination with a chamber adapted to contain a conducting fluid, an armature rotatable therein, and a field-magnet adapted to act upon said armature to cause rotation, of an energizing-winding for said magnet carrying current proportional to the load upon the meter, and a low-potential transformer having its primary winding in derivation to the load-circuit and its secondary winding connected to terminals adapted to direct its current across the armature, substantially as described.

3. In a motor watt-hour meter for alternating currents, the combination with a chamber adapted to contain conducting fluid, an armature rotatable therein, an electromagnet having pole-pieces approaching said armature at each side of its center, and a magnetic return-plate, of an energizing-winding for said magnet in series with the main load-circuit, and a transformer having its primary winding in derivation to the load-circuit and its secondary winding connected to terminals adapted to direct its current across the armature, substantially as described.

4. In a motor watt-hour meter for alternating currents, the combination with a chamber adapted to contain conducting fluid, an armature rotatable therein, an electromagnet having pole-pieces approaching said armature at each side of its center, and a magnetic return-plate, of an energizing-winding for said magnet in series with the main load-circuit, and a low-potential step-down transformer having its primary winding in derivation to the load-current and its secondary winding connected to terminals adapted to direct its current across the armature, substantially as described.

5. In a motor watt-hour meter for alternating currents, the combination with a chamber adapted to contain mercury, an armature rotatable therein, and an electromagnet adapted to produce energizing-fields of opposite polarity on each side of the center of rotation of said armature, of an energizing-winding for said magnet carrying current proportional to the load, and a step-down transformer having its primary winding in derivation to the load-circuit and its secondary winding connected to terminals adapted to direct its current across the armature, substantially as described.

6. In a motor watt-hour meter for alternating currents, the combination with a chamber adapted to contain conducting fluid, an armature rotatable therein, and a field-magnet adapted to act upon said armature to cause rotation, of an energizing-winding for said magnet carrying current proportional to the load upon the meter, a low-potential transformer having its primary winding in derivation to the load-circuit and its secondary winding connected to terminals adapted to direct its current across the armature, and an adjustable inductance in series with said secondary winding.

7. In a motor watt-hour meter for alternating currents, the combination with a chamber adapted to contain conducting fluid, an armature rotatable therein, and a field-magnet adapted to act upon said armature to cause rotation, of an energizing-winding for said magnet in series with the translating devices, and a transformer adapted to direct through the armature a secondary current of low potential proportional to the pressure upon the circuit to which the meter is connected.

8. The method of operating a mercury watt-hour meter upon alternating current, which consists in passing through the armature a low-potential induced current proportional to the circuit-pressure, and in causing a main current-energizing field to react upon said low-potential induced current to produce rotation of the armature, substantially as described.

9. The method of operating by alternating current a motor watt-hour meter having a mercury-chamber, an armature in said chamber, and a magnetic energizing-field adapted to act upon said armature to produce rotation, which consists in passing through the armature a low-potential induced current proportional to the circuit-pressure, and in passing through the energizing-winding of the magnet the main load-current or a derived current proportional thereto.

ROBERT C. LANPHER.

Witnesses:
C. E. PICKARD,
MINNIE A. HUNTER.

It is hereby certified that in Letters Patent No. 843,155, granted February 5, 1907, upon the application of Robert C. Lanphier, of Springfield, Illinois, for an improvement in "Motor-Meters for Alternating Currents and Methods of Operating the Same," errors occur in the printed specification requiring correction, as follows: In line 58, page 3, the letter "a" should read *as*, and in line 69, same page, the word "waits" should read *watts;* and that the said Letters Patent should be read with these corrections therein that the same may conform to the record of the case in the Patent Office.

Signed and sealed this 5th day of March, A. D., 1907.

[SEAL.]

F. I. ALLEN,
*Commissioner of Patents.*